United States Patent
Sugita

(10) Patent No.: US 11,435,566 B2
(45) Date of Patent: Sep. 6, 2022

(54) ZOOM LENS AND IMAGE PICKUP APPARATUS

(71) Applicant: CANON KABUSHIKI KAISHA, Tokyo (JP)

(72) Inventor: Shigenobu Sugita, Shimotsuke (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 84 days.

(21) Appl. No.: 16/114,387

(22) Filed: Aug. 28, 2018

(65) Prior Publication Data
US 2019/0064491 A1 Feb. 28, 2019

(30) Foreign Application Priority Data
Aug. 30, 2017 (JP) ............................. JP2017-165262

(51) Int. Cl.
| G02B 15/14 | (2006.01) |
| G02B 7/02 | (2021.01) |
| G02B 9/64 | (2006.01) |
| G02B 13/06 | (2006.01) |
| G02B 13/02 | (2006.01) |

(52) U.S. Cl.
CPC ........... *G02B 15/1461* (2019.08); *G02B 9/64* (2013.01); *G02B 13/02* (2013.01); *G02B 13/06* (2013.01)

(58) Field of Classification Search
CPC ... G02B 7/04; G02B 7/10; G02B 9/62; G02B 9/64; G02B 13/009; G02B 13/0045; G02B 15/173; G02B 15/14; G02B 15/15; G02B 15/16; G02B 15/28; G03B 5/02; G03B 2205/0046; H04N 5/23296

USPC .............. 348/240.3; 359/682, 676, 694–706
See application file for complete search history.

(56) References Cited

U.S. PATENT DOCUMENTS

| 5,956,185 A * | 9/1999 | Kang ................... G02B 15/163 |
| | | 359/676 |
| 6,646,804 B2 * | 11/2003 | Harada ................ G02B 15/173 |
| | | 359/554 |
| 9,110,278 B2 | 8/2015 | Sugita |
| 9,250,424 B2 | 2/2016 | Sugita |
| 9,268,118 B2 | 2/2016 | Sugita |
| 9,268,119 B2 | 2/2016 | Sugita |

(Continued)

FOREIGN PATENT DOCUMENTS

| JP | 2014035480 A | 2/2014 |
| JP | 2015191008 A | 11/2015 |

*Primary Examiner* — Mahidere S Sahle
(74) *Attorney, Agent, or Firm* — Carter, DeLuca & Farrell LLP

(57) ABSTRACT

A zoom lens including in order from an object side: a positive first unit including negative and positive lenses, a positive second unit, a negative third unit, a positive fourth unit, and a rear lens group, wherein at a time of zooming from a wide angle end to a telephoto end, the first unit moves to the object side, a space between the first and second units increases, and a space between the second and third units increases, and a focal length of the zoom lens at the telephoto end, a zoom lens length at the telephoto end, a change amount of the space between the first and second units during zooming from the wide angle end to the telephoto end, a change amount of the space between the second and third units during zooming from the wide angle end to the telephoto end are appropriately set.

15 Claims, 9 Drawing Sheets

(56) References Cited

U.S. PATENT DOCUMENTS

| | | | |
|---|---|---|---|
| 2010/0149652 A1* | 6/2010 | Imamura | G02B 27/4211 |
| | | | 359/676 |
| 2015/0146044 A1 | 5/2015 | Sugita | |
| 2015/0277090 A1 | 10/2015 | Sugita | |
| 2015/0277091 A1 | 10/2015 | Sugita | |
| 2016/0131879 A1 | 5/2016 | Sugita | |
| 2016/0223800 A1* | 8/2016 | Ikegaya | G03B 13/32 |
| 2017/0052344 A1* | 2/2017 | Obikane | G02B 15/16 |
| 2017/0160526 A1* | 6/2017 | Okumura | G02B 5/005 |
| 2017/0315337 A1 | 11/2017 | Yamaguchi et al. | |
| 2017/0351113 A1 | 12/2017 | Inoue et al. | |
| 2018/0180859 A1 | 6/2018 | Sugita | |
| 2018/0275370 A1 | 9/2018 | Sugita | |
| 2018/0275382 A1 | 9/2018 | Sugita | |
| 2019/0004296 A1 | 1/2019 | Sugita | |

* cited by examiner

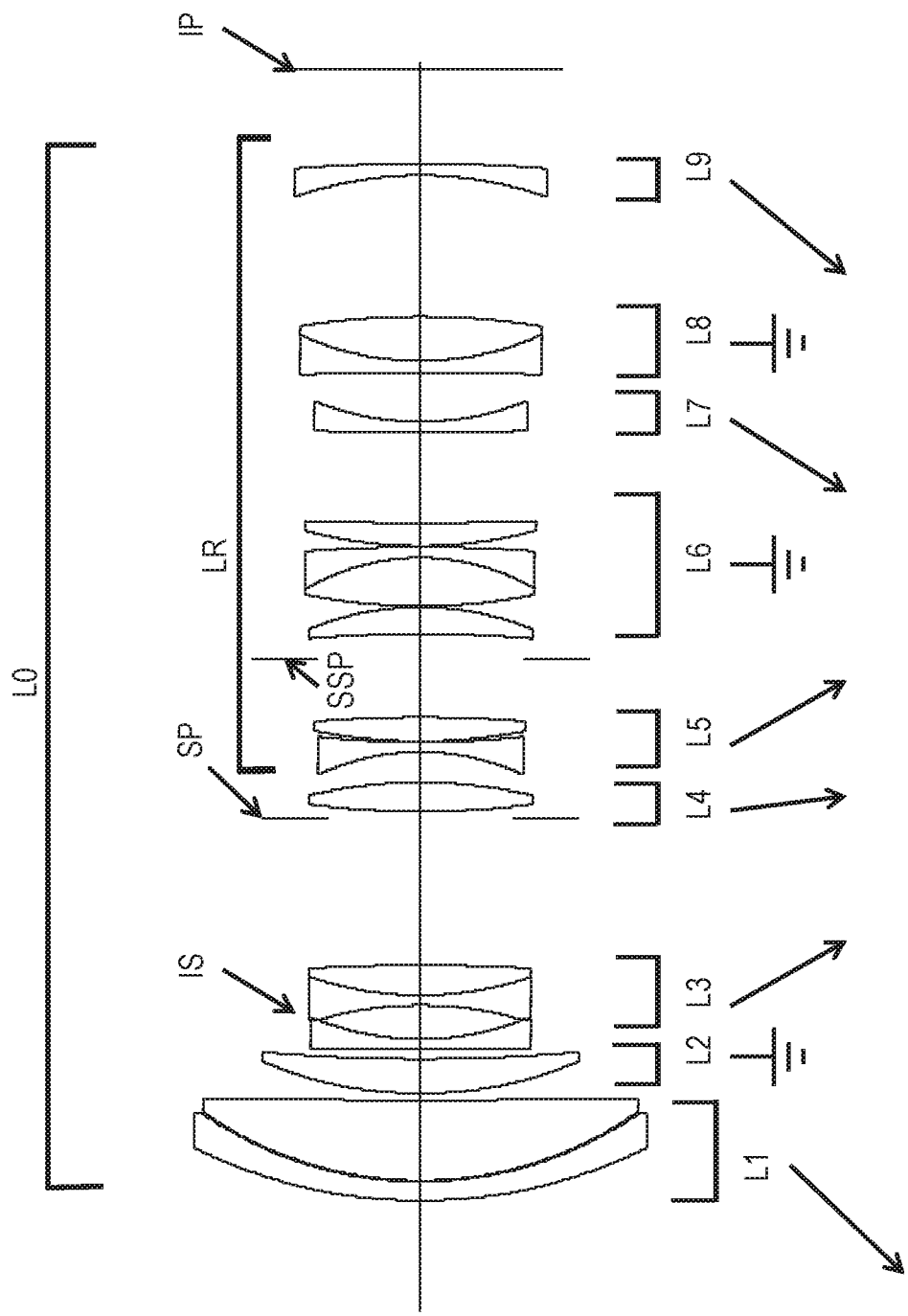

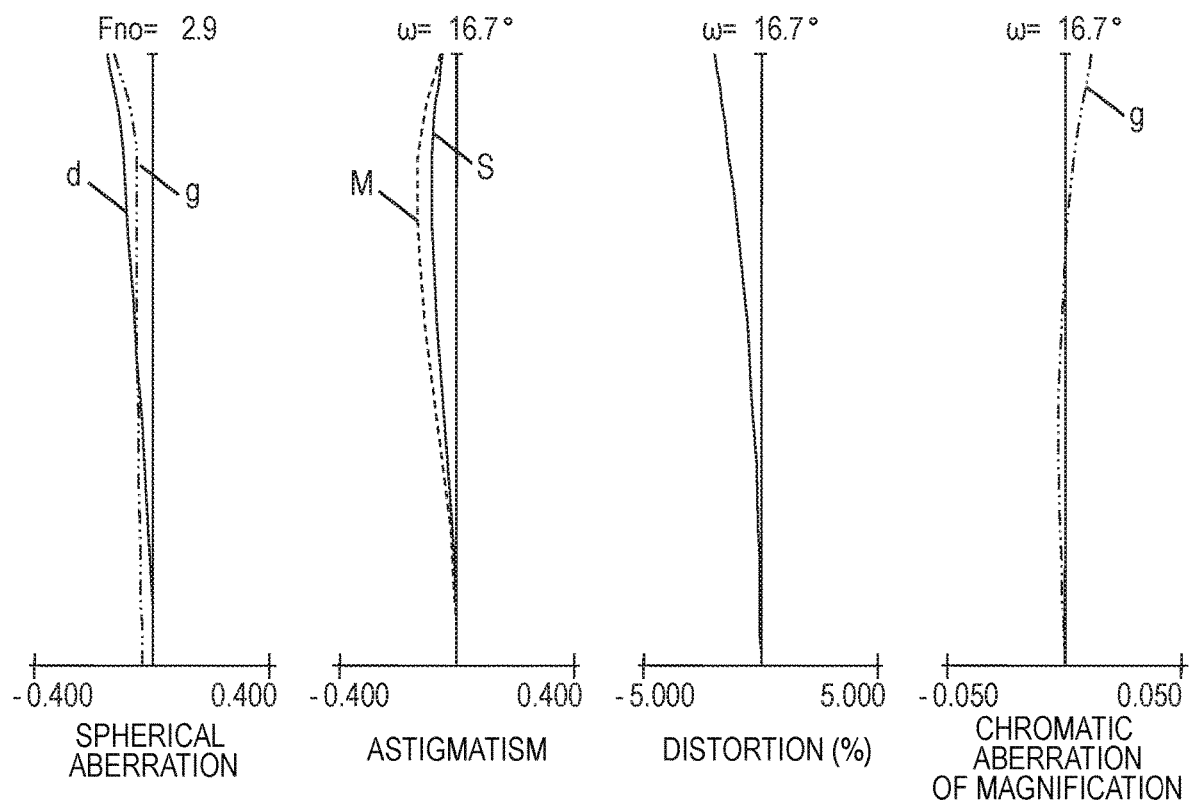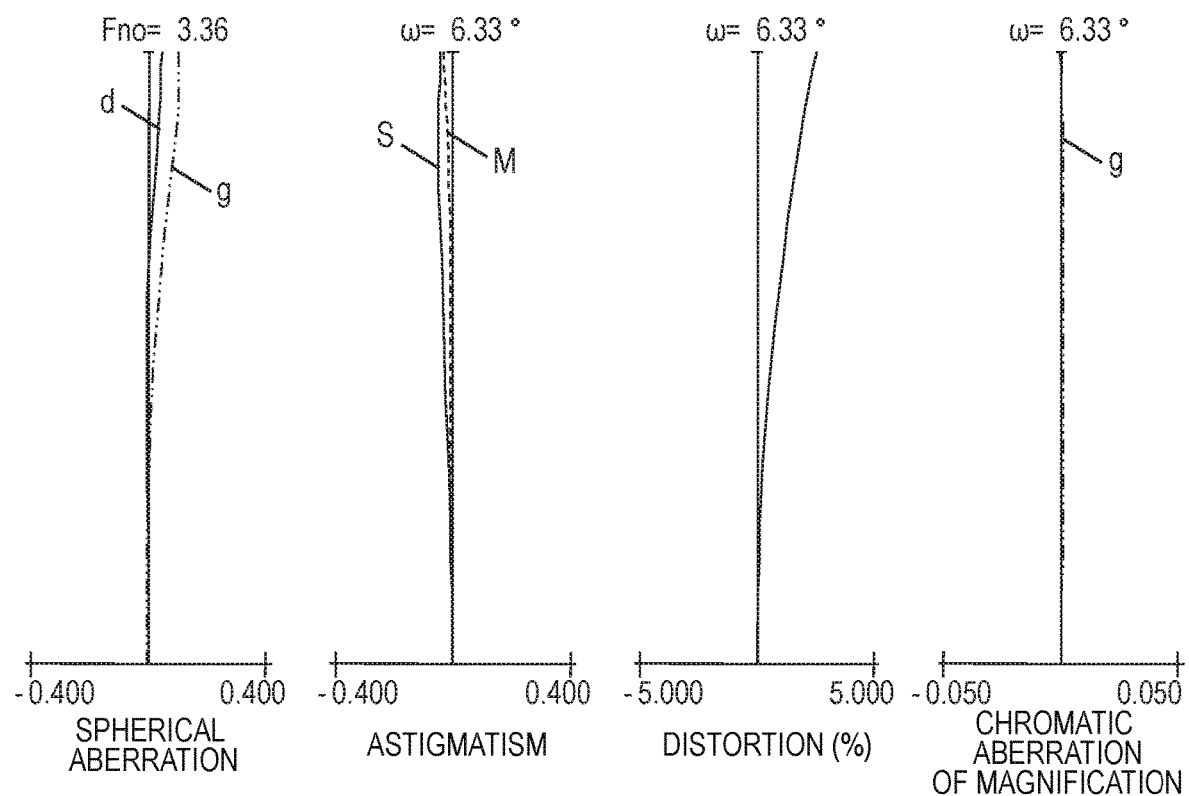

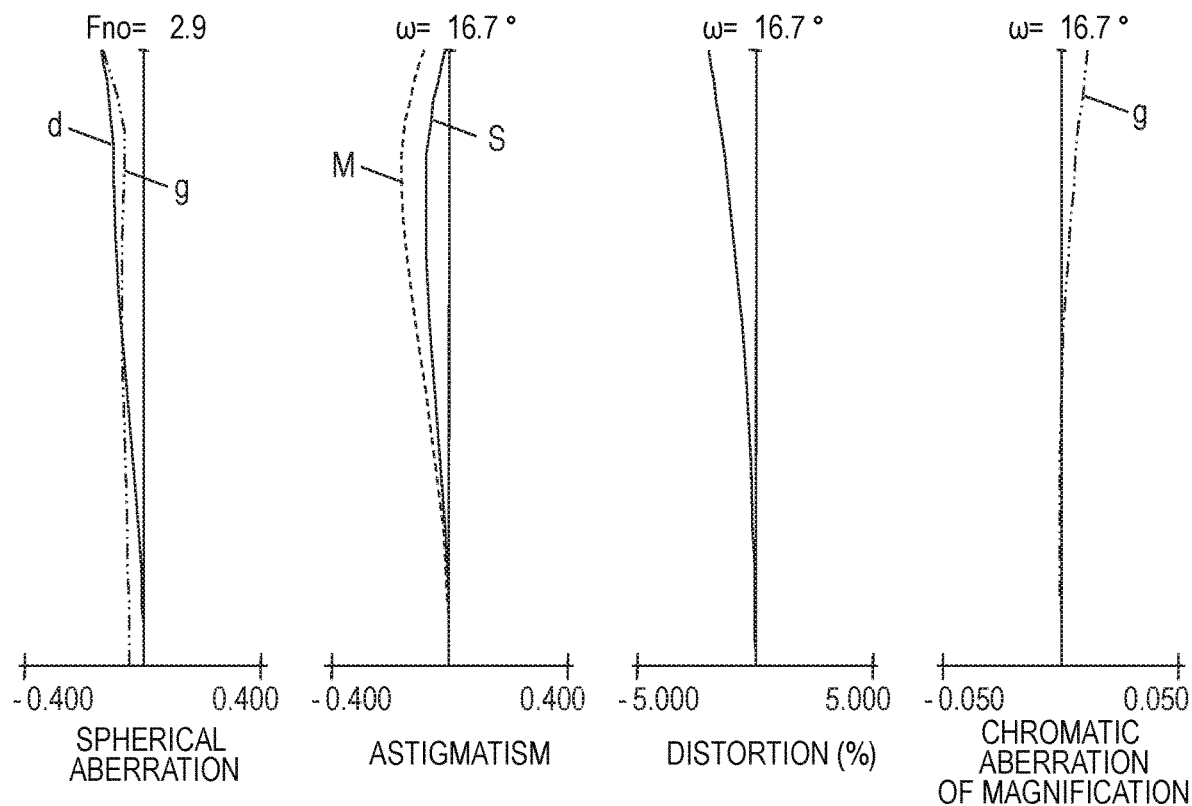
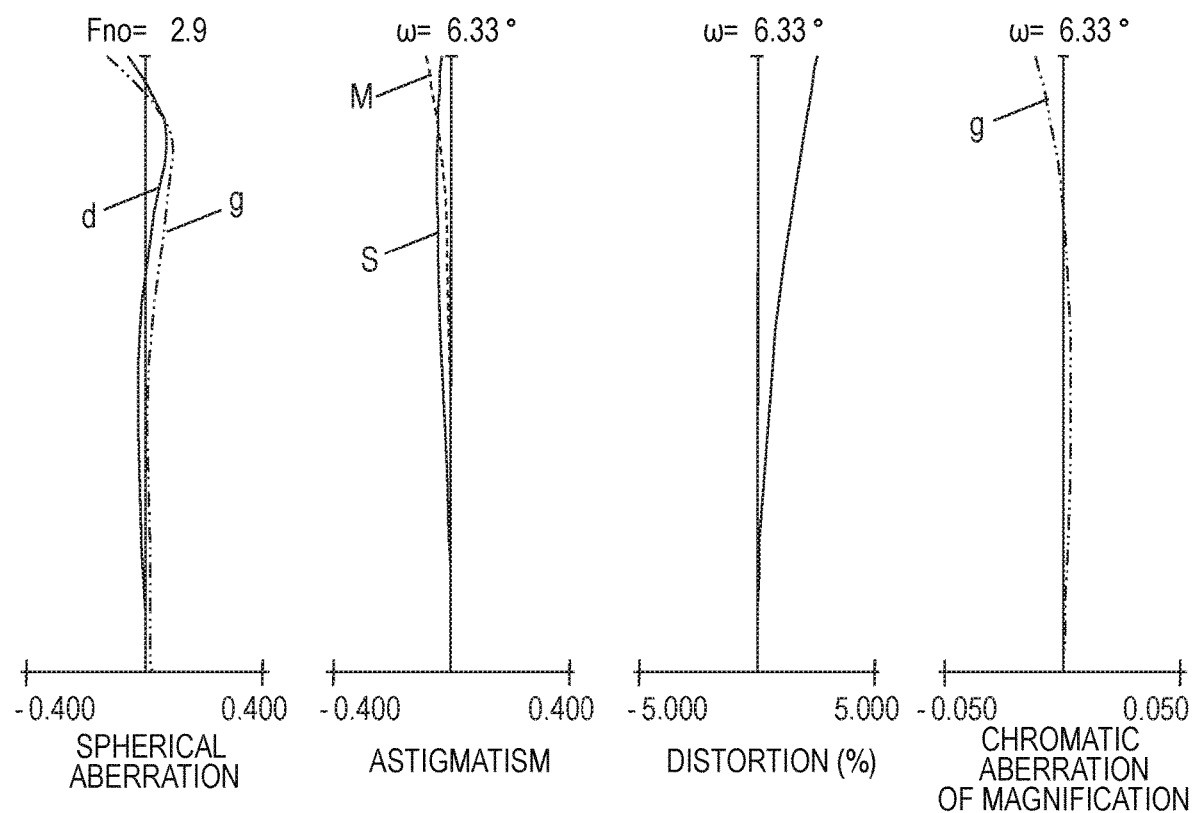

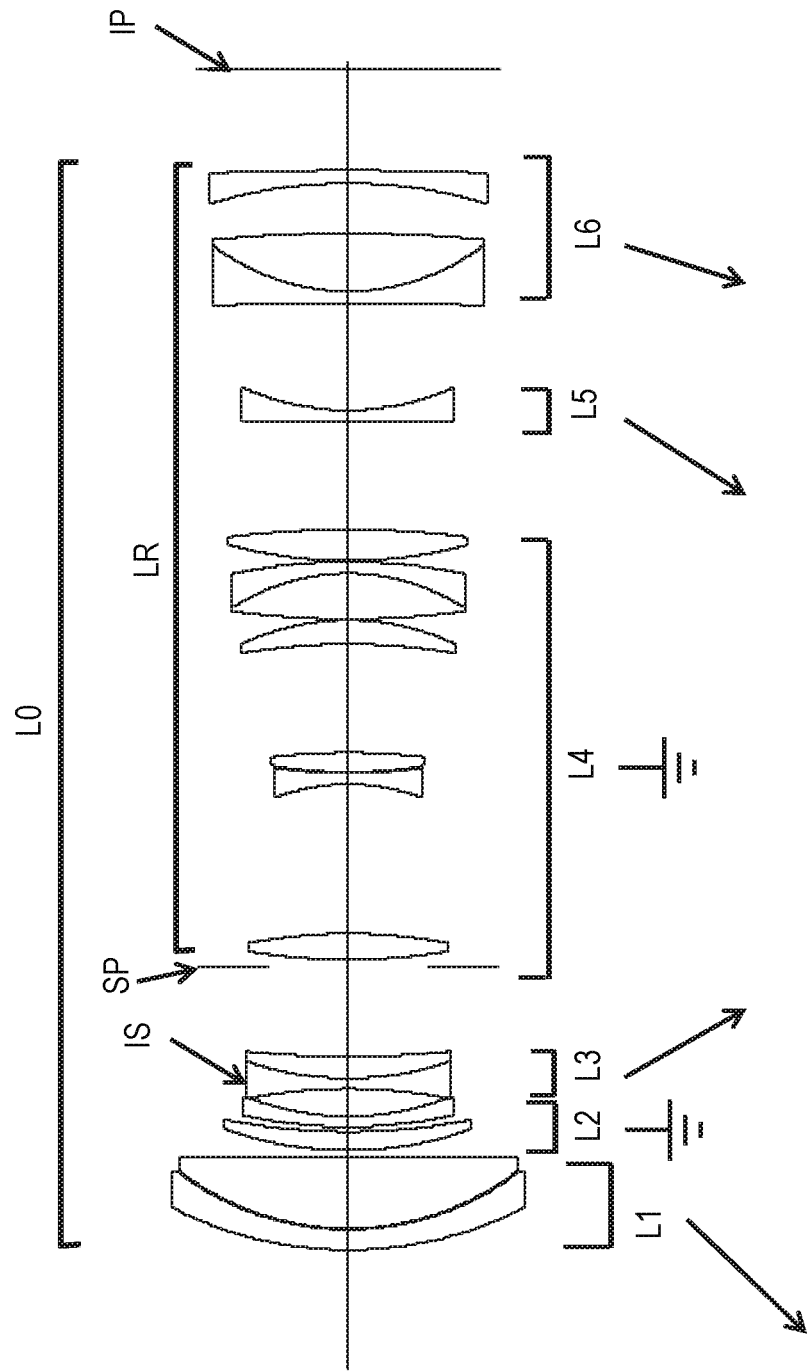

ZOOM LENS AND IMAGE PICKUP APPARATUS

BACKGROUND OF THE INVENTION

Field of the Invention

The present invention relates to a zoom lens and an image pickup apparatus, and is suitable for an image pickup optical system that is used in an image pickup apparatus such as a digital camera, a video camera, a TV camera and a monitoring camera.

Description of the Related Art

For the image pickup optical systems used in image pickup apparatuses (cameras), image pickup optical systems with various focal lengths and diameters are required, depending on the application. For example, a zoom lens of telephoto type that can magnify and photograph a distant subject at a desired angle of view is required to be a zoom lens with a lens entire length being short and the entire system being compact and light, and the like.

In the telephoto zoom lens, the focal length is often longer than the lens entire length at the telephoto end. In the zoom lens like this, a front lens effective diameter is determined by the focal length of the zoom lens at the telephoto end and an F number. If the front lens effective diameter increases, the optical material becomes heavy, and a lens barrel that holds the optical material becomes heavy to increase in rigidity. Consequently, a telephoto zoom lens is desired to be reduced in weight of the entire system. Conventionally, there have been proposed various telephoto zoom lenses.

U.S. Patent Application Publication No. 2017/0315337 discloses a zoom lens that consists of a first lens unit having a positive refractive power, a second lens unit having a negative refractive power, a third lens unit having a positive refractive power, and a fourth lens unit having a positive refractive power, which are disposed in order from an object side to an image side. The first lens unit is moved during zooming, and the spaces among the adjacent lens units change during zooming. Japanese Patent Application Laid-Open No. 2015-191008 discloses a zoom lens that consists of a first lens unit having a positive refractive power, a second lens unit having a negative refractive power, a third lens unit having a positive refractive power, a fourth lens unit having a negative refractive power, a fifth lens unit having a positive refractive power and a sixth lens unit having a negative refractive power, which are disposed in order from an object side to an image side. The first lens unit is moved during zooming, and spaces among the adjacent lens units change during zooming.

The zoom lens for use in an image pickup apparatus is required to have an entire lens system being compact and light and have high optical performance throughout an entire zoom range.

Generally in a telephoto zoom lens, the effective diameter of the front lens unit (first lens unit) tends to be large, and the weight of the front lens unit tends to increase. Therefore, in order to obtain high optical performance throughout the entire zoom range while achieving reduction in size and weight of the entire system in the telephoto zoom lens, it is important to properly set zoom types (the number of lens units, the refractive powers of the respective lens units and the like), the lens configuration of the front lens unit and the like.

SUMMARY OF THE INVENTION

A zoom lens of one embodiment of the present invention is a zoom lens including in order from an object side to an image side: a first lens unit having a positive refractive power; a second lens unit having a positive refractive power; a third lens unit having a negative refractive power; a fourth lens unit having a positive refractive power; and a rear lens group including one or more lens units, with spaces among adjacent lens units changing during zooming, wherein at a time of zooming from a wide angle end to a telephoto end, the first lens unit moves to the object side, a space between the first lens unit and the second lens unit increases, and a space between the second lens unit and the third lens unit increases, the first lens unit includes a negative lens and a positive lens, and conditional expressions:

$$0.5 < ft/Tdt$$

$$1.3 < \Delta D12/\Delta D23 < 5.0$$

are satisfied, where ft is a focal length of the zoom lens at the telephoto end, Tdt is an entire length of the zoom lens at the telephoto end, $\Delta D12$ is a change amount of the space between the first lens unit and the second lens unit during zooming from the wide angle end to the telephoto end, $\Delta D23$ is a change amount of the space between the second lens unit and the third lens unit during zooming from the wide angle end to the telephoto end, and signs of the change amounts of the spaces are set as positive when the spaces increase at the telephoto end as compared with the wide angle end, and are set as negative when the spaces decrease at the telephoto end as compared with the wide angle end.

Further features of the present invention will become apparent from the following description of exemplary embodiments with reference to the attached drawings.

BRIEF DESCRIPTION OF THE DRAWINGS

FIG. 1 is a sectional view at a wide angle end of a zoom lens of embodiment 1.

FIG. 2A is a longitudinal aberration diagram at a wide angle end at a time of focusing on infinity of the zoom lens of embodiment 1.

FIG. 2B is a longitudinal aberration diagram at a telephoto end during focusing on infinity of the zoom lens of embodiment 1.

FIG. 6A is a longitudinal aberration diagram at a wide angle end at a time of focusing on infinity of the zoom lens of embodiment 3.

FIG. 6B is a longitudinal aberration diagram at a telephoto end during focusing on infinity of the zoom lens of embodiment 3.

FIG. 7 is a sectional view at a wide angle end of a zoom lens of embodiment 4.

DESCRIPTION OF THE EMBODIMENTS

Hereinafter, preferable embodiments of the present invention will be described in detail based on the accompanying drawings. A zoom lens of the present invention has a first lens unit having a positive refractive power, a second lens unit having a positive refractive power, a third lens unit having a negative refractive power, a fourth lens unit having a positive refractive power, and a rear lens group including one or more lens units, which are disposed in order from an object side to an image side. The zoom lens of the present invention is a zoom lens in which spaces among adjacent lens units change during zooming.

Definition of the lens unit in the present invention refers to an aggregate of one or more lenses sandwiched between any of a lens surface closest to the object side, a lens surface closest to the image side, and lens surfaces before and after the spaces changing in zooming.

Figure 3:
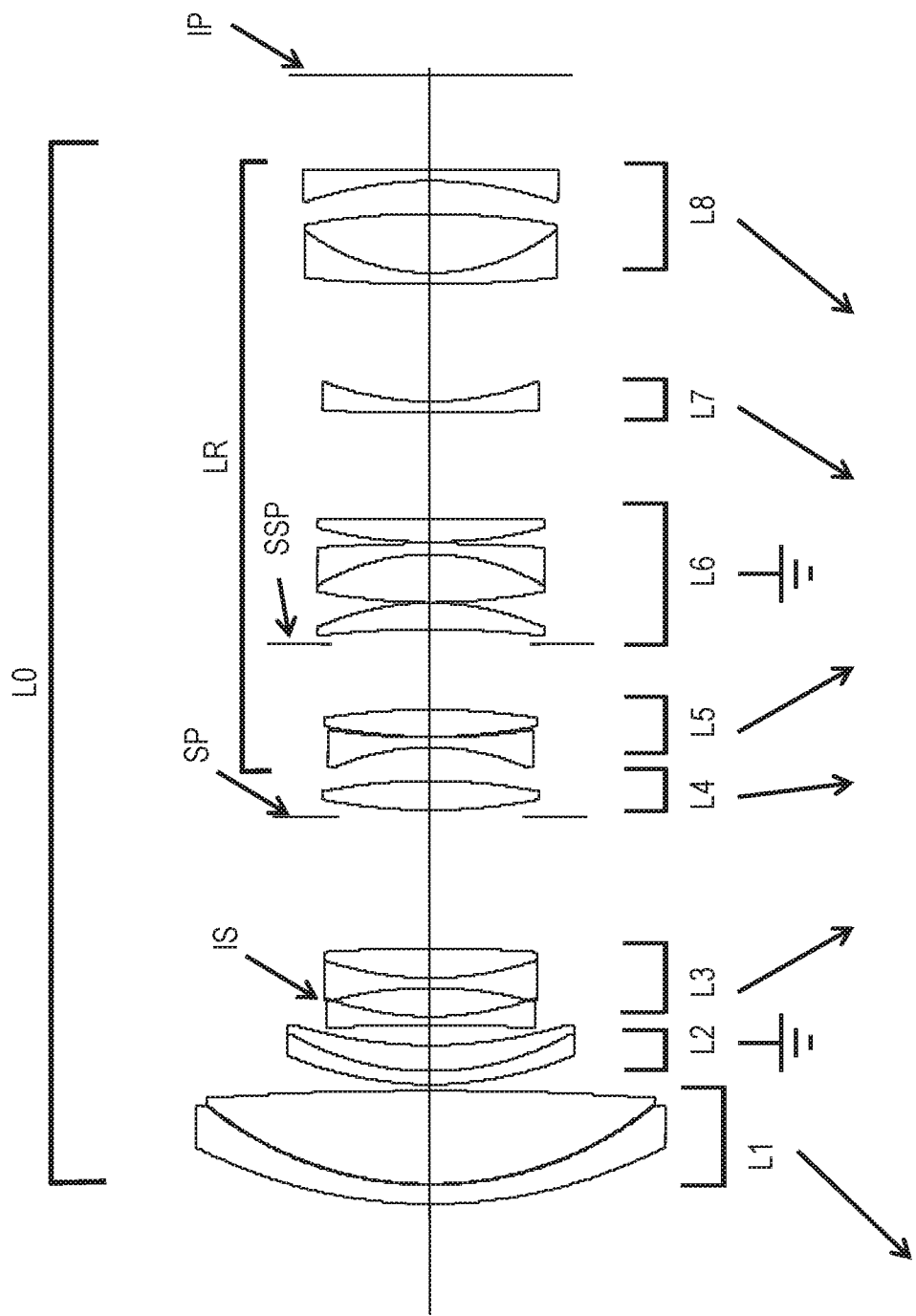
FIG. 3 is a sectional view at a wide angle end of a zoom lens of embodiment 2.
Figure 4A:
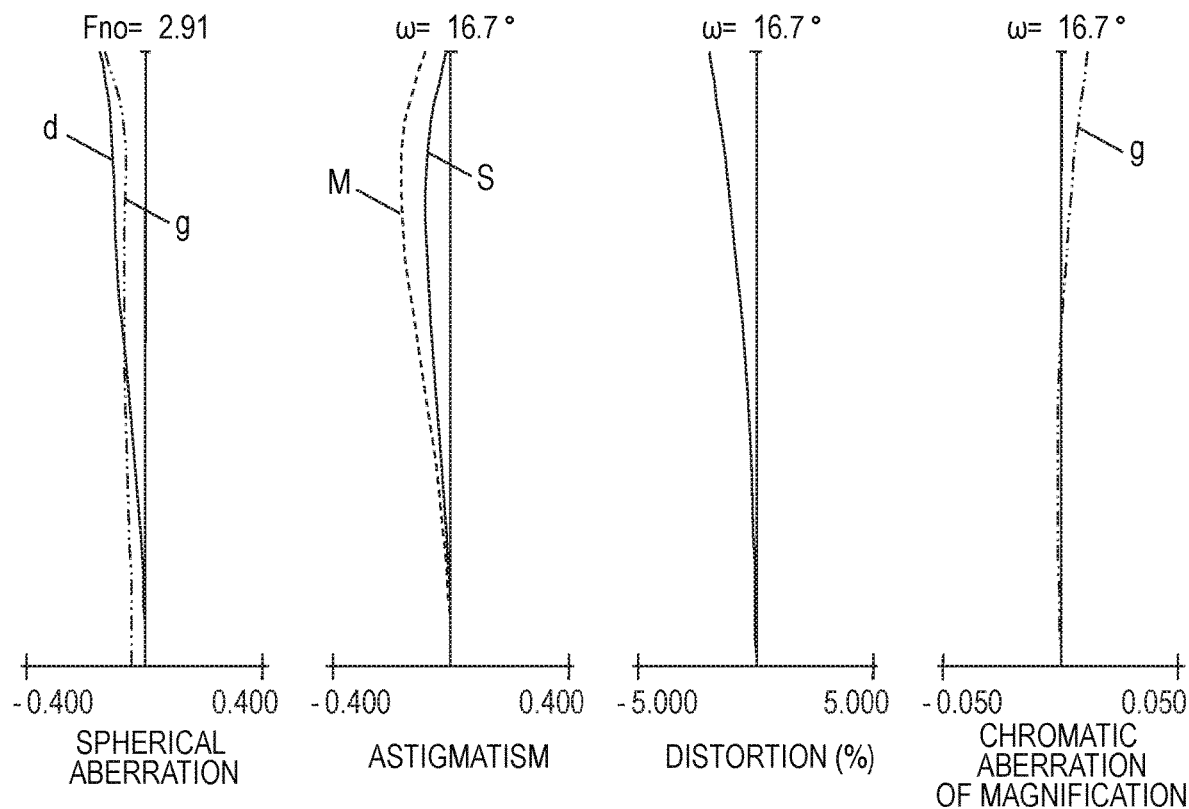
FIG. 4A is a longitudinal aberration diagram at a wide angle end at a time of focusing on infinity of the zoom lens of embodiment 2.
Figure 4B:
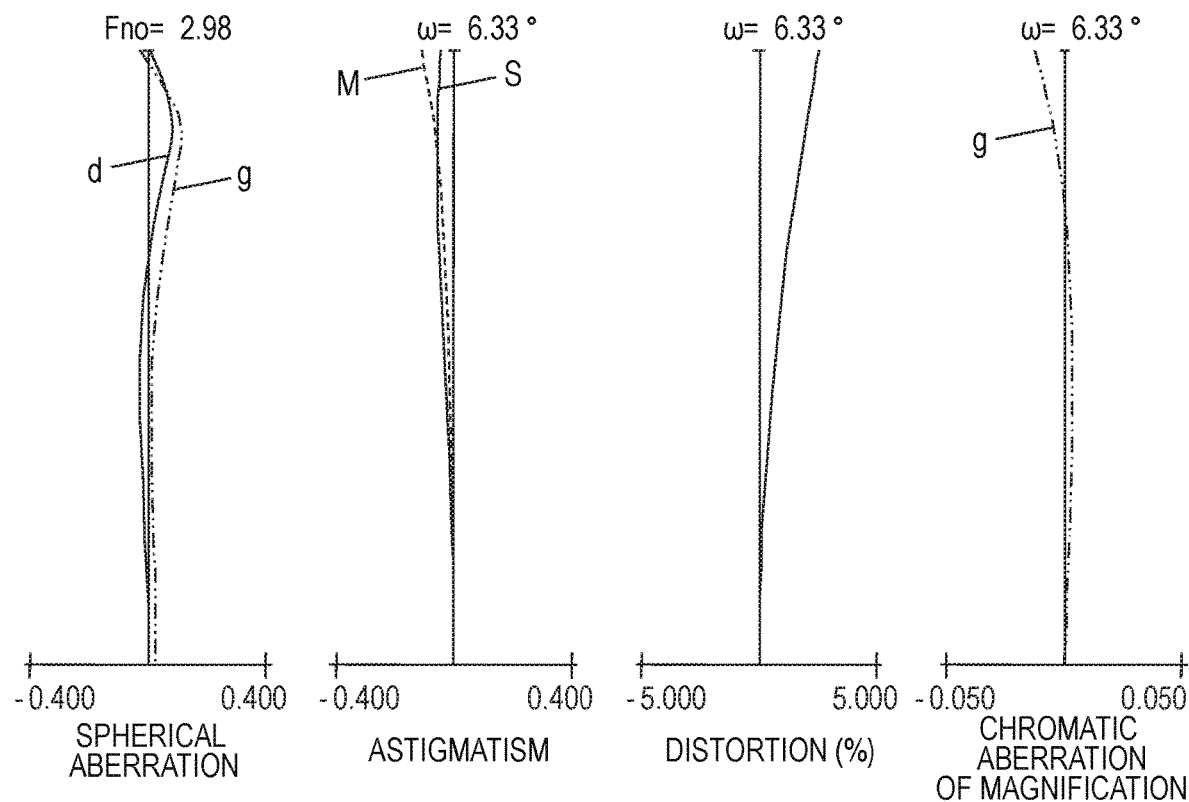
FIG. 4B is a longitudinal aberration diagram at a telephoto end during focusing on infinity of the zoom lens of embodiment 2.

FIG. 1 is a lens sectional view at a wide angle end of embodiment 1. FIGS. 2A and 2B are respectively aberration diagrams at a wide angle end and a telephoto end at a time of focusing on infinity of embodiment 1. Embodiment 1 is a zoom lens with a zoom ratio of 2.71 and an F-number of 2.90 to 3.36. FIG. 3 is a lens sectional view at a wide angle end of embodiment 2. FIGS. 4A and 4B are respectively aberration diagrams at a wide angle end and a telephoto end at a time of focusing on infinity of embodiment 2. Embodiment 2 is a zoom lens with a zoom ratio of 2.71 and an F-number of 2.91 to 2.98.

Figure 5:
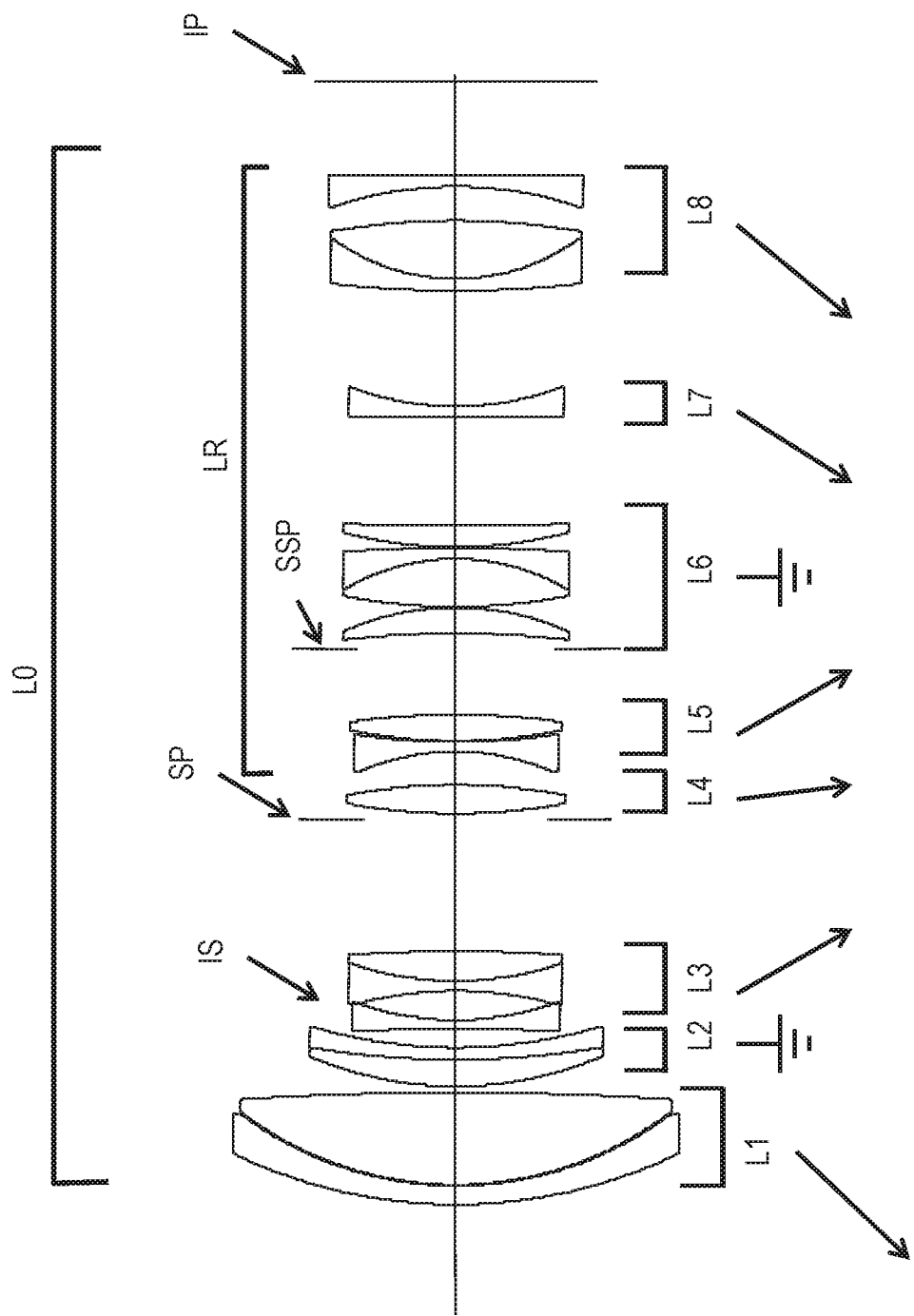
FIG. 5 is a sectional view at a wide angle end of a zoom lens of embodiment 3.
Figure 8A:
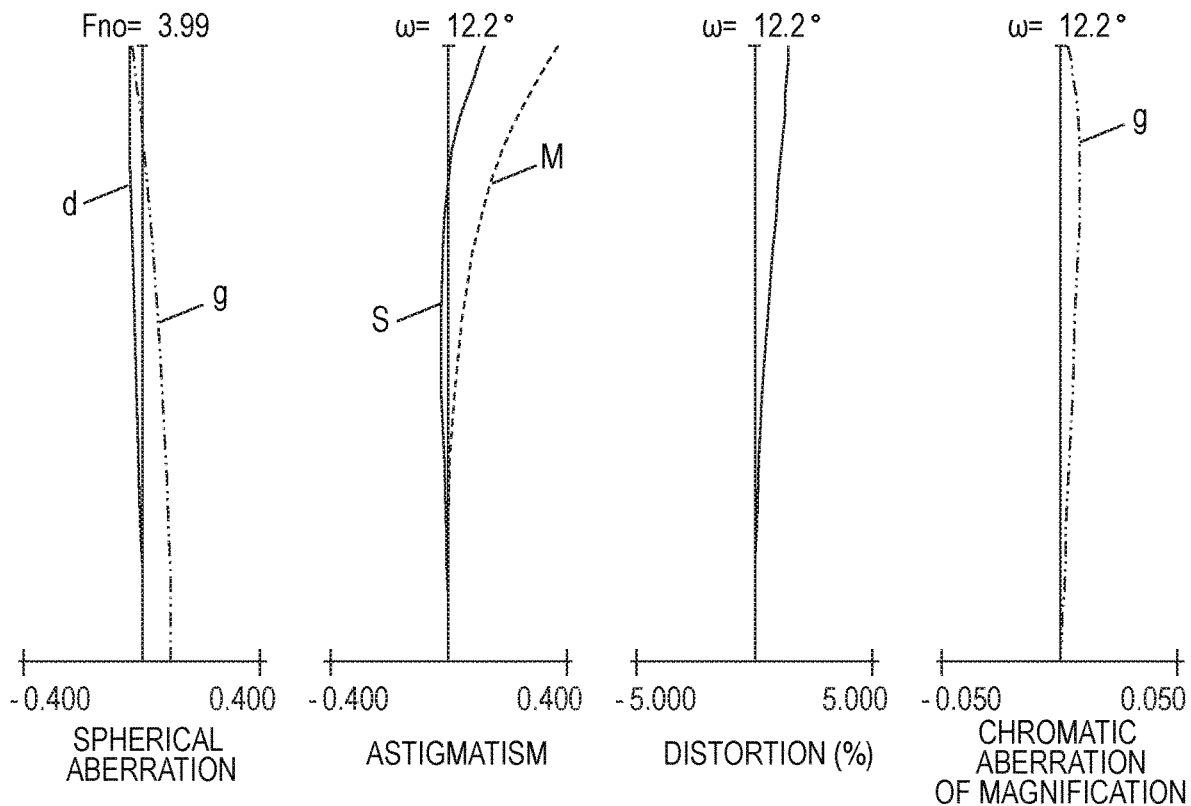
FIG. 8A is a longitudinal aberration diagram at a wide angle end at a time of focusing on infinity of the zoom lens of embodiment 4.
Figure 8B:
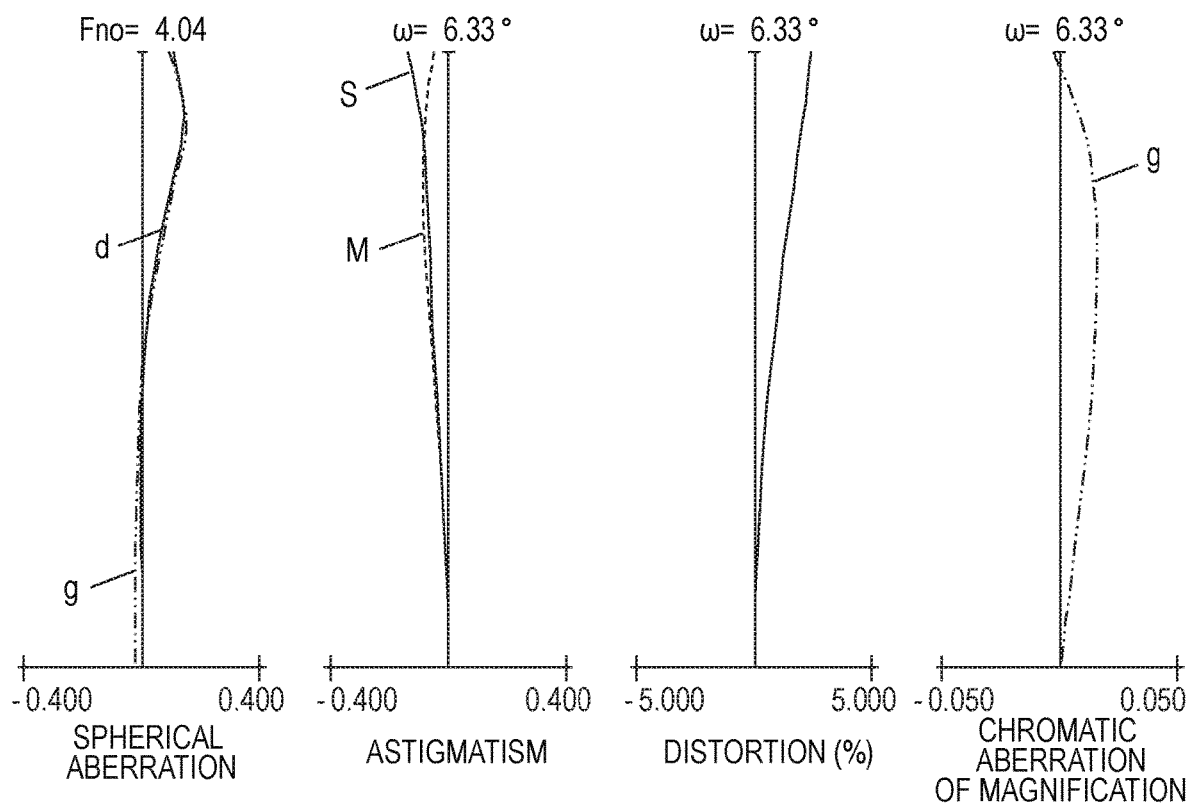
FIG. 8B is a longitudinal aberration diagram at a telephoto end during focusing on infinity of the zoom lens of embodiment 4.
Figure 9:
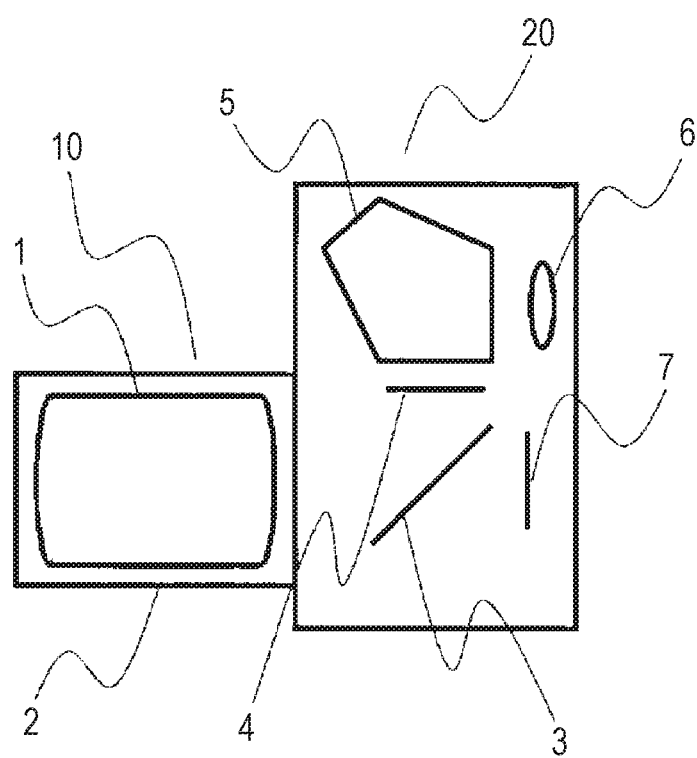
FIG. 9 is a main part schematic view of an image pickup apparatus of the present invention.

FIG. 5 is a lens sectional view at a wide angle end of embodiment 3. FIGS. 6A and 6B are respectively aberration diagrams at a wide angle end and a telephoto end at a time of focusing on infinity of embodiment 3. Embodiment 3 is a zoom lens with a zoom ratio of 2.71, and an F-number of 2.90. FIG. 7 is a lens sectional view at a wide angle end of embodiment 4 of the present invention. FIGS. 8A and 8B are respectively aberration diagrams at a wide angle end and a telephoto end at a time of focusing on infinity of embodiment 4. Embodiment 4 is a zoom lens with a zoom ratio of 1.95, and an F-number of 4.00. FIG. 9 is a main part schematic view of an image pickup apparatus of an embodiment.

Zoom lenses in the respective embodiments are image pickup optical systems that are used in image pickup apparatuses such as a video camera and a digital camera. In each of the lens sectional views, a left part is on an object side (front side), and a right part is on an image side (rear side). Note that the zoom lenses in the respective embodiments may be used in a projector, and at this time, a left part is on a screen side, and a right part is on a projected image side. In each of the lens sectional views, L0 denotes a zoom lens. Reference sign "i" denotes an order of a lens unit from the object side, and reference sign Li denotes an i-th lens unit. Reference sign LR denotes the rear lens group including one or more lens units.

Reference sign SP denotes an aperture stop for light amount adjustment. Reference sign SSP denotes a flare cut stop (FS stop) having a fixed aperture diameter. Reference sign IS denotes a lens system for image blur correction. Reference sign IP denotes an image plane, and corresponds to an image pickup surface of a solid image pickup device (photoelectric conversion element) such as a CCD sensor and a CMOS sensor when the zoom lens is used as an image pickup optical system of a video camera or a digital still camera. In each of the lens sectional views, solid arrows show movement loci of the respective lens units in zooming from the wide angle end to the telephoto end when focusing on infinity.

In a spherical aberration diagram of each of the aberration diagrams, a solid line "d" represents a d-line (wavelength of 587.6 nm), and a two-dot chain line "g" represents a g-line (wavelength of 435.8 nm). In each of astigmatism diagrams, a dotted line M represents a meridional image plane in the d-line, a solid line S represents a sagittal image plane in the d-line. Further, each of diagrams showing distortion shows distortion in the d-line. Chromatic aberration of magnification is shown about the g-line. Reference sign Fno denotes an F-number, and reference sign ω denotes a half angle of view. Note that in each of the following embodiments, the wide angle end and the telephoto end refer to zoom positions at a time of a magnification varying lens unit is positioned at both ends of a range in which the magnification varying lens unit is mechanically movable on an optical axis.

The zoom lens in embodiment 1 has a first lens unit L1 having a positive refractive power, a second lens unit L2 having a positive refractive power, a third lens unit L3 having a negative refractive power, and a fourth lens unit L4 having a positive refractive power, which are disposed in order from the object side to the image side. The zoom lens further includes a fifth lens unit L5 having a negative refractive power, a sixth lens unit L6 having a positive refractive power, a seventh lens unit L7 having a negative refractive power, an eighth lens unit L8 having a positive refractive power and a ninth lens unit L9 having a negative refractive power. A rear lens group LR includes the fifth lens unit L5 to the ninth lens unit L9.

In embodiment 1, the second lens unit L2, the sixth lens unit L6 and the eighth lens unit L8 are immobile at a time of zooming. At a time of zooming from the wide angle end to the telephoto end, the first lens unit L1 moves to the object side, the third lens unit L3 moves to the image side, the fourth lens unit L4 moves to the image side, and the fifth lens unit L5 moves to the image side. Further, the seventh lens unit L7 moves to the object side, and the ninth lens unit L9 moves to the object side.

Zoom lenses of embodiments 2 and 3 each has the first lens unit L1 having a positive refractive power, the second lens unit L2 having a positive refractive power, the third lens unit L3 having a negative refractive power and the fourth lens unit L4 having a positive refractive power, which are disposed in order from the object side to the image side. The zoom lenses each further includes the fifth lens unit L5 having a negative refractive power, the sixth lens unit L6 having a positive refractive power, the seventh lens unit L7 having a negative refractive power, and the eighth lens unit L8 having a positive refractive power. Rear lens groups LR each includes the fifth lens unit L5 to the eighth lens unit L8.

In each of embodiments 2 and 3, the second lens unit L2 and the sixth lens unit L6 are immobile during zooming. During zooming from the wide angle end to the telephoto end, the first lens unit L1 moves to the object side, the third lens unit L3 moves to the image side, and the fourth lens unit L4 moves to the image side. Further, the fifth lens unit L5 moves to the image side, the seventh lens unit L7 moves to the object side, and the eighth lens unit L8 moves to the object side.

The zoom lens in embodiment 4 has the first lens unit L1 having a positive refractive power, the second lens unit L2 having a positive refractive power, the third lens unit L3 having a negative refractive power and the fourth lens unit L4 having a positive refractive power, which are disposed in order from the object side to the image side. Further, the zoom lens includes the fifth lens unit L5 having a negative refractive power and the sixth lens unit L6 having a positive refractive power. A rear lens group LR includes the fifth lens unit L5 and the sixth lens unit L6.

In embodiment 4, the second lens unit L2 and the fourth lens unit L4 are immobile during zooming. During zooming from the wide angle end to the telephoto end, the first lens unit L1 moves to the object side, the third lens unit L3 moves to the image side, the fifth lens unit L5 moves to the object side, and the sixth lens unit L6 moves to the object side.

In a telephoto zoom lens which is a positive lead type zoom lens and extends the first lens unit greatly to the object side during zooming from the wide angle end to the telephoto end, an incidence height h of an axial ray is large at the telephoto end. Therefore, an effective diameter of the first lens unit increases. Further, in the lens units at the image side from the second lens unit, the effective diameters are reduced to some degrees because convergence is performed with the positive refractive power of the first lens unit.

Therefore, the lens unit which is disposed at a position where the incidence height of the axial ray is high at the telephoto end is only the first lens unit. Therefore, the first lens unit needs to have aberration corrected to some extent by only the first lens unit. Therefore, the first lens unit needs to have at least one positive lens formed from a low dispersion material and one negative lens formed from a high dispersion material. Further, in order to obtain a high-resolution image, a positive lens formed from a low dispersion material is preferably further used.

In the telephoto zoom lens, these three lenses occupy most of a weight of the optical system in many cases. On designing a telephoto zoom lens, presence of the second positive lens becomes important to achieve optical performance and reduction in weight.

In the zoom lens of the present invention, of these three lenses, one positive lens is separated from the first lens unit, and the zoom lens includes two lens units that are the first lens unit having a positive refractive power and the second lens unit having a positive refractive power. A relative moving amount to the third lens unit having a negative refractive power is made smaller than the first lens unit. Thereby, the second lens unit is disposed in a midpoint of a ray that converges from the first lens unit to the third lens unit, and an effective diameter of the second lens unit is decreased.

The axial aberration is favorably corrected while a variable power effect is enhanced by causing the space between the first lens unit and the second lens unit to change more greatly than the space between the second lens unit and the third lens unit during zooming from the wide angle end to the telephoto end.

In the zoom lens of the present invention, during zooming from the wide angle end to the telephoto end, the first lens unit L1 moves to the object side, the space between the first lens unit L1 and the second lens unit L2 increases, and the space between the second lens unit L2 and the third lens unit L3 increases. The focal length of the zoom lens at the telephoto end is set as ft, a lens entire length at the telephoto end is set as Tdt. Here, the lens entire length refers to a length obtained by adding a value of back focus of an air-equivalent length to a length to a final lens surface from the first lens surface at the object side. The back focus refers to a length in air from the final lens surface to the image surface.

A change amount of the space between the first lens unit L1 and the second lens unit L2 during zooming from the wide angle end to the telephoto end is set as ΔD12, and a change amount of the space between the second lens unit L2 and the third lens unit L3 during zooming from the wide angle end to the telephoto end is set as ΔD23. A sign of the change amount of the space is set as positive when the space increases at the telephoto end as compared with the wide angle end, and is set as negative when the space decreases at the telephoto end as compared with the wide angle end.

At this time, conditional expressions $$0.5 < ft/Tdt \tag{1}$$

$$1.3 < \Delta D12/\Delta D23 < 5.0 \tag{2}$$

are satisfied.

Next, technical meaning of the aforementioned respective conditional expressions will be described. If "ft" becomes less than a lower limit value of conditional expression (1), the incidence height h of the axial ray does not become sufficiently large in the first lens unit L1. Then, a configuration as the telephoto zoom lens becomes insufficient.

Conditional expression (2) is for making a ratio appropriate, which is between a change of the space between the first lens unit L1 and the second lens unit L2, and a change of the space between the second lens unit L2 and the third lens unit L3 during zooming from the wide angle end to the telephoto end. When the second lens unit L2 comes so close to the third lens unit L3 side at the telephoto end that an upper limit value of conditional expression (2) is exceeded, it becomes difficult to correct axial aberration favorably. When the second lens unit L2 comes so close to the first lens unit L1 side at the telephoto end that a lower limit value of conditional expression (2) is exceeded, an effective diameter of the second lens unit L2 increases, and reduction in weight of the entire system becomes difficult.

Numerical value ranges of conditional expressions (1) and (2) are preferably set as follows.

$$0.6 < ft/Tdt \tag{1a}$$

$$2.0 < \Delta D12/\Delta D23 < 4.5 \tag{2a}$$

In the respective embodiments, one or more of the following conditional expressions are more preferably satisfied. A focal length of the first lens unit L1 is set as fL1, and a focal length of the second lens unit L2 is set as fL2. A moving amount of the first lens unit L1 in zooming from the wide angle end to the telephoto end is set as ΔM1. Here, the moving amount of the lens unit refers to a difference between a position on the optical axis of the lens unit at the wide angle end and a position on the optical axis of the lens unit at the telephoto end. A sign of the moving amount of the lens unit is set as positive when the lens unit is positioned at the image side at the telephoto end as compared with the wide angle end, and a sign is set as negative when the lens unit is positioned at the object side. A lens entire length at the wide angle end is set as Tdw.

A moving amount of the third lens unit L3 during zooming from the wide angle end to the telephoto end is set as ΔM3. A change amount of the space between the first lens unit L1 and the third lens unit L3 during zooming from the wide angle end to the telephoto end is set as ΔD13. The focal length of the first lens unit L1 is set as fL1, the focal length of the second lens unit L2 is set as fL2, the focal length of the third lens unit L3 is set at fL3 and the focal length of the fourth lens unit L4 is set at fL4.

At this time, one or more of the following conditional expressions are preferably satisfied.

$$0.5 < fL1/fL2 < 2.0 \quad (3)$$

$$0.2 < -\Delta M1/Tdw < 0.5 \quad (4)$$

$$0.03 < \Delta M3/Tdw < 0.25 \quad (5)$$

$$0.2 < \Delta D13/Tdw < 0.8 \quad (6)$$

$$0.7 < fL1/ft < 2.0 \quad (7)$$

$$0.6 < fL2/ft < 2.5 \quad (8)$$

$$0.1 < -fL3/ft < 0.5 \quad (9)$$

$$0.15 < fL4/ft < 0.60 \quad (10)$$

Next, technical meaning of the aforementioned respective conditional expressions will be described. Conditional expression (3) is for making refractive power distribution of the positive refractive power of the first lens unit L1 and the positive refractive power of the second lens unit L2 appropriate. If an upper limit value of conditional expression (3) is exceeded, and the positive refractive power of the first lens unit L1 is too small, it becomes difficult to obtain a magnification effect. If a lower limit value of conditional expression (3) is exceeded, and the positive refractive power of the second lens unit L2 is too small, correction of axial aberration becomes difficult.

Conditional expression (4) is for making a relationship between the moving amount of the first lens unit L1 during zooming and the lens entire length at the wide angle end, that is, a relationship between a length of a lens barrel of the first lens unit L1 and a lens entire length of the main body favorable, and for making a simple lens-barrel structure. If an upper limit value of conditional expression (4) is exceeded, the lens-barrel length of the first lens unit L1 becomes too long with respect to the lens entire length, and a mechanism becomes a complicated mechanism such as a multiple extension structure, and the entire body is increased in weight. If a lower limit value of conditional expression (4) is exceeded, and the moving amount of the first lens unit L1 becomes small, it becomes difficult to correct variation in axial chromatic aberration during zooming.

Conditional expression (5) is for simplifying moving mechanisms of the first lens unit L1 and the third lens unit L3. The first lens unit L1 and the third lens unit L3 move in opposite directions during zooming, so that layout of a cam ring in which the moving trajectories of the respective lens units are cut becomes difficult.

Normally, when the moving directions of the respective lens units are the same, layout can be made with the moving trajectories overlapping one another. However, when the lens units move in the opposite directions, overlapping cannot be performed. That is, an entire length of the cam ring is determined by a result of adding up the moving amounts of the first lens unit L1 and the third lens unit L3. Consequently, if an upper limit value of conditional expression (5) is exceeded, the cam ring becomes long, that is, the entire length of the main body increases, so that exceeding the upper limit is not preferable. If a lower limit value of conditional expression (5) is exceeded, a change in the space between the first lens unit L1 and the second lens unit L2 cannot be sufficiently taken, so that it is not preferable that the lower limit is exceeded.

Conditional expression (6) is for making a change in the space between the first lens unit L1 and the third lens unit L3 during zooming appropriate. If an upper limit value of conditional expression (6) is exceeded, layout of the cam ring becomes difficult, and the lens entire length becomes long, so that exceeding the upper limit value is not preferable. If a lower limit value of conditional expression (6) is exceeded, a variation in axial aberration following zooming becomes large, so that it is not preferable that the lower limit value is exceeded.

If an upper limit value of conditional expression (7) is exceeded, an extension amount of the first lens unit L1 increases during zooming from the wide angle end to the telephoto end, and the entire system increases in size, so that exceeding the upper limit value is not preferable. If a lower limit value of conditional expression (7) is exceeded, the variation in the axial aberration increases during zooming, so that it is not preferable that the lower limit value is exceeded.

If an upper limit value of conditional expression (8) is exceeded, the effective diameters of the lens units at the image side from the second lens unit L2 increase, and the entire system increases in diameter to make reduction in weight of the entire body difficult. If a lower limit of conditional expression (8) is exceeded, the variation in the axial aberration following zooming increases, so that it is not preferable that the lower limit value is exceeded.

If an upper limit value of conditional expression (9) is exceeded, the moving amount of the third lens unit L3 to the image side increases during zooming from the wide angle end to the telephoto end, the cam ring becomes long, and the main body increases in size, so that exceeding the upper limit value is not preferable. If a lower limit value of conditional expression (9) is exceeded, the variation in the axial aberration increases during zooming from the wide angle end to the telephoto end, so that it is not preferable that the lower limit value is exceeded.

If an upper limit value of conditional expression (10) is exceeded, a moving amount to the image side, of the fourth lens unit L4 increases during zooming from the wide angle end to the telephoto end, so that the entire system increases in size, and therefore exceeding the upper limit value is not preferable. If a lower limit value of conditional expression (10) is exceeded, the variation in the axial aberration increases during zooming, so that it is not preferable that the lower limit value is exceeded.

It is further preferable to set numerical value ranges of conditional expressions (3) to (10) as follows.

$$0.6 < fL1/fL2 < 1.8 \quad (3a)$$

$$0.2 < -\Delta M1/Tdw < 0.40 \quad (4a)$$

$$0.05 < \Delta M3/Tdw < 0.18 \quad (5a)$$

$$0.25 < \Delta D13/Tdw < 0.60 \quad (6a)$$

$$0.8 < fL1/ft < 1.6 \quad (7a)$$

$$0.7 < fL2/ft < 2.0 \quad (8a)$$

$$0.15 < -fL3/ft < 0.40 \quad (9a)$$

$$0.2 < fL4/ft < 0.5 \quad (10a)$$

The following lens configurations can be preferably adopted in the respective embodiments. The first lens unit L1 can include a negative lens and a positive lens. The first lens unit L1 needs to have aberration corrected in the lens unit, and can include one negative lens and one positive lens for weight reduction. Further, the second lens unit L2 can include two or less lenses including one positive lens. The second lens unit L2 is an auxiliary to the positive refractive power of the first lens unit L1, and therefore can include at least one positive lens. The second lens unit L2 can preferably include two positive lenses.

One positive lens included in the second lens unit L2 can be in a meniscus shape with a convex surface facing to the object side. The second lens unit L2 is in a convergent pencil of rays going to the third lens unit L3 from the first lens unit L1, and therefore can cause rays of light to be close to a normal line direction by being formed into the meniscus shape with the convex surface facing to the object side, so that aberration correction can be performed without generating excessive high-order aberration, and therefore the meniscus shape with the convex surface facing to the object side is preferable.

Next, the third lens unit L3 can move to the image side during zooming from the wide angle end to the telephoto end. Moving the third lens unit L3 to the image side easily increases the space from the first lens unit L1 efficiently, and therefore is preferable. Further, the second lens unit L2 can be immobile during zooming.

The first lens unit L1 is moved to the object side and the third lens unit L3 is moved to the image side during zooming from the wide angle end to the telephoto end, and thereby the second lens unit L2 positioned between the first lens unit L1 and the third lens unit L3 can be made immobile during zooming, whereby the mechanical structure is simplified, so that it is preferable.

In embodiment 1, the second lens unit L2 includes the positive lens in the meniscus shape with the convex surface facing to the object side, and favorably corrects the axial aberration. By change of the space between the first lens unit L1 and the second lens unit L2 and the space between the second lens unit L2 and the third lens unit L3, a variation in the axial chromatic aberration is suppressed while the second lens unit L2 is reduced in diameter. Further, by setting the moving amount of the first lens unit L1 and the moving amount of the third lens unit L3 properly, the variation in the axial aberration following zooming is corrected while reduction in the lens entire length is achieved.

Next, by properly setting refractive powers of the first lens unit L1 and the second lens unit L2, variation in the axial aberration following reduction in weight of the second lens unit L2 and zooming is corrected. By properly setting the refractive powers of the first lens unit L1 to the fourth lens unit L4, variation in the axial aberration following zooming is corrected while reduction in size and reduction in weight of the entire system are achieved. Focusing onto a close range from infinity is performed by moving the seventh lens unit to the image side, and the fifth lens unit to the object side. An image stabilization lens unit for image blur correction is the third lens unit L3.

In embodiment 2, the second lens unit L2 favorably corrects axial aberration as a cemented lens obtained by joining a negative lens in a meniscus shape with a convex surface facing to the object side and a positive lens in a meniscus shape with a convex surface facing to the object side. Focusing onto the close range from infinity is performed by moving the seventh lens unit to the image side. The variation-proof lens unit for image blur correction is the third lens unit L3. The other lens configurations are the same as in embodiment 1.

Embodiment 3 differs in a point of forming the second lens unit L2 of a cemented lens obtained by joining a positive lens in a meniscus shape with a convex surface facing to the object side and a negative lens in a meniscus shape with a convex surface facing to the object side, as compared with embodiment 2. The other configurations are the same as in embodiment 2.

In embodiment 4, focusing onto the close range from infinity is performed by moving the fifth lens unit L5 to the image side.

Next, an embodiment of a digital still camera (image pickup apparatus) using the zoom lens of the embodiments as an image pickup optical system will be described with use of FIG. 9.

In FIG. 9, a lens system 1 is held by a lens barrel 2 which is a holding member. Reference sign 20 denotes a camera main body, which has a quick return mirror 3 that reflects a pencil of rays from the lens system 1 upward, and a focusing glass 4 disposed in an image forming apparatus of the lens system 1. Further, the camera main body has a roof pentaprism 5 that converts an inverse image formed on the focusing glass 4 into an erect image, an eyepiece lens 6 for observing the elect image, and the like.

Reference sign 7 denotes a photosensitive surface, where a solid image pickup device (photoelectric conversion element) that receives an image formed by the lens system 1, such as a CCD sensor and a CMOS sensor is disposed. During photographing, the quick return mirror 3 withdraws from an optical path, and an image is formed on the photosensitive surface 7 by the lens system 1.

The advantages described in embodiments 1 to 4 are effectively enjoyed in the image pickup apparatus disclosed in the present embodiment. The present invention can be similarly applied to a mirrorless single-lens reflex camera without the quick return mirror 3 as the image pickup apparatus.

While the preferable embodiments of the present invention are described thus far, it is needless to say that the present invention is not limited to these embodiments, and various modifications and changes can be made within the range of the gist of the present invention.

Hereinafter, numerical embodiments 1 to 4 corresponding to embodiments 1 to 4 will be shown. In the respective numerical embodiment, "i" denotes an order of a surface from the object side. In the numerical embodiment, "ri" denotes a radius of curvature of an i-th lens surface in order from the object side, "di" denotes lens thickness or air-spacing between the i-th surface and the (i+1)-th surface, ndi and vdi respectively denote a refractive index and an Abbe's number of the material of the optical medium between the i-th surface and the (i+1)-th surface. Reference sign BF denotes back focus.

Further, in addition to specifications such as the focal length and the F-number, a half angle of view of the entire system, an image height is a maximum image height that determines the half angle of view, and the lens entire length is a length from the first lens surface to the image surface. Back focus BF denotes a length from the final lens surface to the image surface. Further, respective lens unit data show the respective lens units and the focal lengths of the respective lens units. Reference numeral eai denotes an effective diameter of an i-th surface.

Further, a part where the space "d" of each of the optical surfaces is (variable) changes during zooming, and surface spaces corresponding to the focal lengths are written in an attached table. Note that Table 1 shows calculation results of the respective conditional expressions based on the lens data of the numerical value data 1 to 4 described as follows.

Numerical Embodiment 1

Unit mm

Surface data

| Surface number i | ri | di | ndi | vdi | Effective diameter |
|---|---|---|---|---|---|
| 1 | 77.876 | 2.90 | 1.83400 | 37.2 | 67.67 |
| 2 | 58.365 | 0.15 | | | 65.03 |
| 3 | 57.714 | 12.31 | 1.43387 | 95.1 | 65.14 |
| 4 | 3265.962 | (variable) | | | 64.67 |
| 5 | 62.166 | 5.29 | 1.49700 | 81.5 | 47.10 |
| 6 | 283.921 | (variable) | | | 46.39 |
| 7 | −2565.283 | 1.50 | 1.77250 | 49.6 | 32.43 |
| 8 | 43.446 | 5.17 | | | 31.00 |
| 9 | −54.195 | 1.50 | 1.60311 | 60.6 | 31.00 |
| 10 | 51.726 | 4.59 | 1.90366 | 31.3 | 32.44 |
| 11 | −289.087 | (variable) | | | 32.57 |
| 12(Stop) | (SP) ∞ | 1.00 | | | (variable) |
| 13 | 136.885 | 4.46 | 1.76385 | 48.5 | 32.81 |
| 14 | −72.151 | (variable) | | | 32.70 |
| 15 | −36.684 | 1.50 | 1.85478 | 24.8 | 29.00 |
| 16 | 147.718 | 0.15 | | | 30.03 |
| 17 | 84.403 | 3.64 | 1.89286 | 20.4 | 30.58 |
| 18 | −184.640 | (variable) | | | 30.84 |
| 19(SSP) | ∞ | 4.00 | | | 31.44 |
| 20 | −189.924 | 4.10 | 1.76385 | 48.5 | 32.48 |
| 21 | −44.163 | 0.15 | | | 33.00 |
| 22 | 90.178 | 7.36 | 1.59522 | 67.7 | 33.23 |
| 23 | −34.578 | 1.70 | 1.90366 | 31.3 | 33.08 |
| 24 | −209.530 | 0.15 | | | 33.61 |
| 25 | 68.698 | 3.53 | 1.59522 | 67.7 | 33.75 |
| 26 | 834.826 | (variable) | | | 33.56 |
| 27 | 807.473 | 1.60 | 1.83481 | 42.7 | 30.98 |
| 28 | 43.535 | (variable) | | | 30.31 |
| 29 | −662.294 | 1.80 | 1.53172 | 48.8 | 34.21 |
| 30 | 44.273 | 6.75 | 1.68893 | 31.1 | 35.21 |
| 31 | −120.619 | (variable) | | | 35.35 |
| 32 | −57.107 | 1.80 | 1.59522 | 67.7 | 36.09 |
| 33 | −232.185 | | | | 37.31 |

Various data
Zoom ratio 2.71

| | Wide angle | Intermediate | Telephoto |
|---|---|---|---|
| Focal length | 72.00 | 135.00 | 194.98 |
| F-number | 2.90 | 3.19 | 3.36 |
| Half angle of view (degree) | 16.72 | 9.11 | 6.33 |
| Image height | 21.64 | 21.64 | 21.64 |
| Lens entire length | 172.73 | 218.46 | 231.71 |
| BF | 14.37 | 24.57 | 33.27 |
| d 4 | 1.00 | 46.74 | 60.00 |
| d 6 | 1.54 | 14.80 | 24.44 |
| d11 | 22.49 | 11.83 | 2.05 |
| d14 | 4.63 | 7.36 | 8.54 |
| d18 | 8.72 | 3.39 | 2.34 |
| d26 | 13.84 | 8.23 | 1.50 |
| d28 | 7.44 | 13.05 | 19.78 |
| d31 | 21.60 | 11.40 | 2.69 |
| ea12 | 28.14 | 31.02 | 32.70 |
| Entrance pupil position | 50.38 | 169.98 | 234.87 |
| Exit pupil position | −57.02 | −55.16 | −57.46 |
| Front principal point position | 49.77 | 76.40 | 10.85 |
| Rear principal point position | −57.63 | −110.42 | −161.71 |

Lens unit data

| Unit | Initial surface | Focal length | Lens configuration length | Front principal point position | Rear principal point position |
|---|---|---|---|---|---|
| 1 | 1 | 254.46 | 15.36 | −2.78 | −13.04 |
| 2 | 5 | 158.89 | 5.29 | −0.98 | −4.48 |
| 3 | 7 | −49.87 | 12.76 | 0.57 | −8.94 |
| 4 | 12 | 62.43 | 5.46 | 2.67 | −0.88 |
| 5 | 15 | −75.45 | 5.29 | −1.46 | −4.42 |
| 6 | 19 | 43.42 | 20.99 | 7.91 | −6.54 |
| 7 | 27 | −55.17 | 1.60 | 0.92 | 0.05 |
| 8 | 29 | 118.97 | 8.55 | 4.00 | −1.20 |
| 9 | 32 | −127.73 | 1.80 | −0.37 | −1.50 |

Single lens data

| Lens | Initial surface | Focal length |
|---|---|---|
| 1 | 1 | −299.57 |
| 2 | 3 | 135.26 |
| 3 | 5 | 158.89 |
| 4 | 7 | −55.29 |
| 5 | 9 | −43.65 |
| 6 | 10 | 48.87 |
| 7 | 13 | 62.43 |
| 8 | 15 | −34.25 |
| 9 | 17 | 65.29 |
| 10 | 20 | 74.43 |
| 11 | 22 | 42.94 |
| 12 | 23 | −46.04 |
| 13 | 25 | 125.55 |
| 14 | 27 | −55.17 |
| 15 | 29 | −77.98 |
| 16 | 30 | 47.81 |
| 17 | 32 | −127.73 |

Numerical Embodiment 2

Unit mm

Surface data

| Surface number i | ri | di | ndi | vdi | Effective diameter |
|---|---|---|---|---|---|
| 1 | 78.155 | 2.90 | 1.77250 | 49.6 | 70.25 |
| 2 | 54.634 | 0.15 | | | 66.91 |
| 3 | 53.938 | 14.27 | 1.43387 | 95.1 | 66.96 |
| 4 | −534.187 | (variable) | | | 66.40 |
| 5 | 56.483 | 2.00 | 1.85478 | 24.8 | 42.53 |
| 6 | 43.013 | 4.01 | 1.76385 | 48.5 | 41.02 |
| 7 | 73.228 | (variable) | | | 40.21 |
| 8 | −1082.949 | 1.50 | 1.77250 | 49.6 | 30.65 |
| 9 | 46.579 | 4.41 | | | 29.55 |
| 10 | −58.590 | 1.50 | 1.67790 | 55.3 | 29.55 |
| 11 | 50.072 | 4.53 | 1.90366 | 31.3 | 30.92 |
| 12 | −233.783 | (variable) | | | 31.38 |
| 13(Stop) | (SP) ∞ | 1.00 | | | (variable) |
| 14 | 87.566 | 4.44 | 1.76385 | 48.5 | 31.93 |
| 15 | −87.761 | (variable) | | | 31.79 |
| 16 | −36.856 | 1.50 | 1.85478 | 24.8 | 28.16 |
| 17 | 105.022 | 0.15 | | | 30.07 |
| 18 | 81.783 | 4.08 | 1.89286 | 20.4 | 30.71 |
| 19 | −110.615 | (variable) | | | 31.27 |
| 20(SSP) | ∞ | 2.38 | | | (variable) |
| 21 | −152.398 | 4.00 | 1.76385 | 48.5 | 32.67 |
| 22 | −42.517 | 0.15 | | | 33.18 |
| 23 | 94.545 | 7.35 | 1.59522 | 67.7 | 33.16 |
| 24 | −33.361 | 1.70 | 1.90366 | 31.3 | 32.95 |
| 25 | −209.286 | 0.15 | | | 33.36 |
| 26 | 69.320 | 3.42 | 1.59522 | 67.7 | 33.36 |
| 27 | 1082.777 | (variable) | | | 33.15 |
| 28 | 1049.827 | 1.60 | 1.83481 | 42.7 | 31.74 |
| 29 | 44.859 | (variable) | | | 30.93 |
| 30 | 163.343 | 1.80 | 1.48749 | 70.2 | 35.67 |
| 31 | 31.444 | 9.11 | 1.62588 | 35.7 | 36.93 |
| 32 | −109.235 | 4.96 | | | 37.00 |

-continued

Unit mm

| | | | | | |
|---|---|---|---|---|---|
| 33 | −58.709 | 1.80 | 1.83481 | 42.7 | 36.54 |
| 34 | −1854.055 | | | | 37.57 |

Various data
Zoom ratio 2.71

| | Wide angle | Intermediate | Telephoto |
|---|---|---|---|
| Focal length | 72.00 | 134.99 | 194.97 |
| F-number | 2.91 | 2.91 | 2.98 |
| Half angle of view (degree) | 16.73 | 9.11 | 6.33 |
| Image height | 21.64 | 21.64 | 21.64 |
| Lens entire length | 172.73 | 219.96 | 231.71 |
| BF | 14.37 | 18.40 | 28.12 |
| d 4 | 1.00 | 48.24 | 60.00 |
| d 7 | 2.85 | 15.42 | 25.02 |
| d12 | 20.19 | 11.19 | 1.99 |
| d15 | 5.12 | 8.15 | 10.32 |
| d19 | 9.96 | 3.36 | 0.80 |
| d27 | 16.51 | 9.32 | 1.50 |
| d29 | 17.87 | 21.01 | 19.11 |
| ea13 | 28.04 | 30.02 | 31.60 |
| ea20 | 30.14 | 29.65 | 28.87 |
| Entrance pupil position | 51.62 | 186.74 | 258.13 |
| Exit pupil position | −55.62 | −54.05 | −50.22 |
| Front principal point position | 49.56 | 70.20 | −32.15 |
| Rear principal point position | −57.63 | −116.59 | −166.86 |

Lens unit data

| Unit | Initial surface | Focal length | Lens configuration length | Front principal point position | Rear principal point position |
|---|---|---|---|---|---|
| 1 | 1 | 214.59 | 17.32 | 0.19 | −11.65 |
| 2 | 5 | 322.32 | 6.01 | −12.02 | −14.82 |
| 3 | 8 | −49.26 | 11.93 | 0.66 | −8.00 |
| 4 | 13 | 58.02 | 5.44 | 2.27 | −1.27 |
| 5 | 16 | −85.50 | 5.73 | −2.48 | −5.75 |
| 6 | 20 | 44.93 | 19.16 | 6.34 | −6.35 |
| 7 | 28 | −56.18 | 1.60 | 0.91 | 0.04 |
| 8 | 30 | 1758.99 | 17.67 | −200.55 | −191.35 |

Single lens data

| Lens | Initial surface | Focal length |
|---|---|---|
| 1 | 1 | −248.34 |
| 2 | 3 | 113.75 |
| 3 | 5 | −226.51 |
| 4 | 6 | 129.06 |
| 5 | 8 | −57.78 |
| 6 | 10 | −39.61 |
| 7 | 11 | 45.98 |
| 8 | 14 | 58.02 |
| 9 | 16 | −31.76 |
| 10 | 18 | 53.19 |
| 11 | 21 | 76.00 |
| 12 | 23 | 42.34 |
| 13 | 24 | −44.12 |
| 14 | 26 | 124.27 |
| 15 | 28 | −56.18 |
| 16 | 30 | −80.24 |
| 17 | 31 | 40.01 |
| 18 | 33 | −72.66 |

Numerical Embodiment 3

Unit mm

Surface data

| Surface number i | ri | di | ndi | vdi | Effective diameter |
|---|---|---|---|---|---|
| 1 | 78.561 | 2.90 | 1.77250 | 49.6 | 67.31 |
| 2 | 55.112 | 0.15 | | | 64.87 |
| 3 | 54.419 | 14.15 | 1.43387 | 95.1 | 65.03 |
| 4 | −539.844 | (variable) | | | 64.58 |
| 5 | 57.664 | 4.11 | 1.76385 | 48.5 | 43.73 |
| 6 | 136.488 | 1.80 | 1.85478 | 24.8 | 42.93 |
| 7 | 76.413 | (variable) | | | 41.40 |
| 8 | −1288.838 | 1.50 | 1.77250 | 49.6 | 30.72 |
| 9 | 45.855 | 4.49 | | | 29.68 |
| 10 | −57.359 | 1.50 | 1.67790 | 55.3 | 29.68 |
| 11 | 49.762 | 4.60 | 1.90366 | 31.3 | 31.21 |
| 12 | −213.847 | (variable) | | | 31.42 |
| 13(Stop) (SP) | ∞ | 1.00 | | | (variable) |
| 14 | 88.708 | 4.44 | 1.76385 | 48.5 | 32.11 |
| 15 | −87.343 | (variable) | | | 31.99 |
| 16 | −37.080 | 1.50 | 1.85478 | 24.8 | 28.20 |
| 17 | 105.127 | 0.15 | | | 30.13 |
| 18 | 81.672 | 4.05 | 1.89286 | 20.4 | 30.77 |
| 19 | −113.017 | (variable) | | | 31.29 |
| 20(SSP) | ∞ | 2.40 | | | (variable) |
| 21 | −149.471 | 3.97 | 1.76385 | 48.5 | 32.78 |
| 22 | −42.641 | 0.15 | | | 33.20 |
| 23 | 92.161 | 7.34 | 1.59522 | 67.7 | 33.23 |
| 24 | −33.666 | 1.70 | 1.90366 | 31.3 | 33.04 |
| 25 | −216.035 | 0.15 | | | 33.45 |
| 26 | 69.805 | 3.44 | 1.59522 | 67.7 | 33.46 |
| 27 | 1465.166 | (variable) | | | 33.21 |
| 28 | 1420.225 | 1.60 | 1.83481 | 42.7 | 31.84 |
| 29 | 45.004 | (variable) | | | 31.03 |
| 30 | 174.343 | 1.80 | 1.48749 | 70.2 | 35.70 |
| 31 | 32.033 | 8.98 | 1.62588 | 35.7 | 37.00 |
| 32 | −108.719 | 5.22 | | | 37.08 |
| 33 | −58.687 | 1.80 | 1.83481 | 42.7 | 36.59 |
| 34 | −985.284 | | | | 37.63 |

Various data
Zoom ratio 2.71

| | Wide angle | Intermediate | Telephoto |
|---|---|---|---|
| Focal length | 72.00 | 134.99 | 194.97 |
| F-number | 2.90 | 2.90 | 2.90 |
| Half angle of view (degree) | 16.73 | 9.11 | 6.33 |
| Image height | 21.64 | 21.64 | 21.64 |
| Lens entire length | 172.73 | 220.23 | 231.71 |
| BF | 14.37 | 18.47 | 28.28 |
| d 4 | 1.00 | 48.51 | 60.00 |
| d 7 | 2.78 | 15.28 | 25.08 |
| d12 | 20.12 | 11.19 | 1.94 |
| d15 | 5.11 | 8.14 | 10.28 |
| d19 | 10.08 | 3.48 | 0.80 |
| d27 | 16.55 | 9.36 | 1.50 |
| d29 | 17.83 | 20.91 | 18.96 |
| ea13 | 28.11 | 30.14 | 31.77 |
| ea20 | 30.34 | 29.84 | 32.38 |
| Entrance pupil position | 51.17 | 186.38 | 257.66 |
| Exit pupil position | −56.16 | −54.55 | −50.51 |
| Front principal point position | 49.67 | 71.80 | −29.89 |
| Rear principal point position | −57.63 | −116.53 | −166.70 |

-continued

Unit mm

Lens unit data

| Unit | Initial surface | Focal length | Lens configuration length | Front principal point position | Rear principal point position |
|---|---|---|---|---|---|
| 1 | 1 | 214.99 | 17.20 | 0.17 | -11.58 |
| 2 | 5 | 312.32 | 5.91 | -11.04 | -13.84 |
| 3 | 8 | -49.36 | 12.10 | 0.57 | -8.24 |
| 4 | 13 | 58.25 | 5.44 | 2.28 | -1.26 |
| 5 | 16 | -85.31 | 5.70 | -2.42 | -5.67 |
| 6 | 20 | 44.85 | 19.14 | 6.36 | -6.34 |
| 7 | 28 | -55.70 | 1.60 | 0.90 | 0.03 |
| 8 | 30 | 1457.01 | 17.80 | -162.69 | -157.85 |

Single lens data

| Lens | Initial surface | Focal length |
|---|---|---|
| 1 | 1 | -252.64 |
| 2 | 3 | 114.77 |
| 3 | 5 | 127.83 |
| 4 | 6 | -205.95 |
| 5 | 8 | -57.29 |
| 6 | 10 | -39.09 |
| 7 | 11 | 45.05 |
| 8 | 14 | 58.25 |
| 9 | 16 | -31.91 |
| 10 | 18 | 53.63 |
| 11 | 21 | 76.87 |
| 12 | 23 | 42.35 |
| 13 | 24 | -44.33 |
| 14 | 26 | 123.03 |
| 15 | 28 | -55.70 |
| 16 | 30 | -80.84 |
| 17 | 31 | 40.53 |
| 18 | 33 | -74.82 |

Numerical Embodiment 4

Unit mm

Surface data

| Surface number i | ri | di | ndi | vdi | Effective diameter |
|---|---|---|---|---|---|
| 1 | ∞ | 1.80 | | | 50.05 |
| 2 | 55.130 | 2.90 | 1.78590 | 44.2 | 48.89 |
| 3 | 39.917 | 0.15 | | | 46.76 |
| 4 | 39.526 | 10.06 | 1.43387 | 95.1 | 46.85 |
| 5 | 14978.990 | (variable) | | | 46.29 |
| 6 | 51.873 | 2.63 | 1.49700 | 81.5 | 33.70 |
| 7 | 87.550 | (variable) | | | 33.12 |
| 8 | 68.052 | 1.50 | 1.77250 | 49.6 | 28.70 |
| 9 | 39.455 | 3.89 | | | 27.64 |
| 10 | -77.709 | 1.50 | 1.51633 | 64.1 | 27.61 |
| 11 | 44.651 | 3.06 | 1.85026 | 32.3 | 27.59 |
| 12 | 132.470 | (variable) | | | 27.40 |
| 13(Stop) | ∞ | 1.00 | | | (variable) |
| 14 | 90.503 | 3.68 | 1.51633 | 64.1 | 27.20 |
| 15 | -73.505 | 21.25 | | | 27.01 |
| 16 | -28.162 | 1.50 | 1.85478 | 24.8 | 18.99 |
| 17 | 69.517 | 0.15 | | | 19.91 |
| 18 | 60.910 | 2.78 | 1.89286 | 20.4 | 20.17 |
| 19 | -98.098 | 15.44 | | | 20.60 |
| 20 | -89.527 | 3.41 | 1.76385 | 48.5 | 28.55 |
| 21 | -35.570 | 0.15 | | | 29.28 |
| 22 | 127.364 | 6.47 | 1.51823 | 58.9 | 30.36 |
| 23 | -29.939 | 1.70 | 1.90366 | 31.3 | 30.48 |
| 24 | -76.991 | 0.15 | | | 31.78 |
| 25 | 66.893 | 4.38 | 1.53775 | 74.7 | 32.62 |
| 26 | -138.711 | (variable) | | | 32.57 |
| 27 | -761.465 | 1.60 | 1.77250 | 49.6 | 28.87 |
| 28 | 36.368 | (variable) | | | 28.41 |
| 29 | -797.229 | 1.80 | 1.49700 | 81.5 | 34.27 |
| 30 | 31.423 | 8.21 | 1.74951 | 35.3 | 37.15 |
| 31 | -204.385 | 7.14 | | | 37.24 |
| 32 | -67.366 | 1.80 | 1.83481 | 42.7 | 37.17 |
| 33 | -499.883 | | | | 38.19 |

Various data
Zoom ratio 1.95

| | Wide angle | Intermediate | Telephoto |
|---|---|---|---|
| Focal length | 99.99 | 149.97 | 194.94 |
| F-number | 3.99 | 3.91 | 4.04 |
| Half angle of view (degree) | 12.21 | 8.21 | 6.33 |
| Image height | 21.64 | 21.64 | 21.64 |
| Lens entire length | 169.51 | 199.37 | 208.48 |
| BF | 14.37 | 24.91 | 25.16 |
| d 5 | 1.01 | 30.88 | 40.00 |
| d 7 | 0.73 | 4.14 | 10.35 |
| d12 | 12.82 | 9.41 | 3.20 |
| d26 | 15.38 | 7.92 | 1.50 |
| d28 | 15.10 | 12.00 | 18.17 |
| ea13 | 22.64 | 52.25 | 27.29 |
| Entrance pupil position | 41.34 | 102.73 | 133.05 |
| Exit pupil position | -73.22 | -69.99 | -75.91 |
| Front principal point position | 27.18 | 15.69 | -48.01 |
| Rear principal point position | -85.62 | -125.06 | -169.78 |

Zoom lens unit data

| Unit | Initial surface | Focal length | Lens configuration length | Front principal point position | Rear principal point position |
|---|---|---|---|---|---|
| 1 | 1 | 174.61 | 14.91 | -0.42 | -10.96 |
| 2 | 6 | 250.00 | 2.63 | -2.50 | -4.21 |
| 3 | 8 | -72.44 | 9.95 | 3.84 | -3.48 |
| 4 | 13 | 50.59 | 62.05 | 59.08 | -17.46 |
| 5 | 27 | -44.89 | 1.60 | 0.86 | -0.04 |
| 6 | 29 | 693.05 | 18.95 | -72.06 | -77.84 |

Single lens data

| Lens | Initial surface | Focal length |
|---|---|---|
| 1 | 1 | -200.93 |
| 2 | 4 | 91.32 |
| 3 | 6 | 250.00 |
| 4 | 8 | -124.39 |
| 5 | 10 | -54.69 |
| 6 | 11 | 77.97 |
| 7 | 14 | 79.16 |
| 8 | 16 | -23.28 |
| 9 | 18 | 42.44 |
| 10 | 20 | 75.21 |
| 11 | 22 | 47.44 |
| 12 | 23 | -55.16 |
| 13 | 25 | 84.55 |
| 14 | 27 | -44.89 |
| 15 | 29 | -60.79 |
| 16 | 30 | 36.89 |
| 17 | 32 | -93.44 |

TABLE 1

|  | Numerical embodiment 1 | Numerical embodiment 2 | Numerical embodiment 3 | Numerical embodiment 4 |
|---|---|---|---|---|
| fw | 72.00 | 72.00 | 72.00 | 100.00 |
| ft | 194.98 | 194.97 | 194.97 | 194.98 |
| Tdw | 172.73 | 172.73 | 172.73 | 169.54 |
| Tdt | 231.71 | 231.71 | 231.71 | 208.57 |
| fL1 | 254.46 | 214.59 | 214.99 | 174.64 |
| fL2 | 158.89 | 322.32 | 312.32 | 250.00 |
| fL3 | −49.87 | −49.26 | −49.36 | −72.44 |
| fL4 | 62.43 | 58.02 | 58.25 | 50.59 |
| ΔM1 | −59.00 | −59.00 | −59.00 | −39.03 |
| ΔM3 | 22.90 | 22.17 | 22.30 | 9.58 |
| ΔD12 | 59.00 | 59.00 | 59.00 | 38.99 |
| ΔD23 | 22.90 | 22.17 | 22.30 | 9.62 |
| ΔD13 | 81.90 | 81.17 | 81.30 | 48.61 |
| (1) ft/Tdt | 0.841 | 0.841 | 0.841 | 0.935 |
| (2) Δ12/Δ23 | 2.576 | 2.661 | 2.646 | 4.053 |
| (3) fL1/fL2 | 1.601 | 0.666 | 0.688 | 0.699 |
| (4) −ΔM1/Tdw | 0.342 | 0.342 | 0.342 | 0.230 |
| (5) ΔM3/Tdw | 0.133 | 0.128 | 0.129 | 0.057 |
| (6) D13/Tdw | 0.474 | 0.470 | 0.471 | 0.287 |
| (7) fL1/ft | 1.305 | 1.101 | 1.103 | 0.896 |
| (8) fL2/ft | 0.815 | 1.653 | 1.602 | 1.282 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-165262, filed Aug. 30, 2017, which is hereby incorporated by reference herein in its entirety.

What is claimed is:

1. A zoom lens comprising in order from an object side to an image side: a first lens unit having a positive refractive power; a second lens unit having a positive refractive power; a third lens unit having a negative refractive power; a fourth lens unit having a positive refractive power; and a rear lens group including one or more lens units, wherein:

during zooming from a wide angle end to a telephoto end, the first lens unit moves to the object side, a space between the first lens unit and the second lens unit increases, a space between the second lens unit and the third lens unit increases, and each space between adjacent lens unit among all of the lens units constituting the zoom lens changes, the first lens unit consists of a negative lens and a positive lens, the negative lens and the positive lens are apart from each other, the second lens unit includes a positive meniscus lens having a convex surface facing the object side, and conditional expressions:

$$0.5 < ft/Tdt,$$

$$1.3 < \Delta D12/\Delta D23 < 5.0, \text{ and}$$

$$0.6 < fL1/fL2 < 1.8,$$

are satisfied, where ft is a focal length of the zoom lens at the telephoto end, Tdt is an entire length of the zoom lens at the telephoto end, ΔD12 is a change amount of the space between the first lens unit and the second lens unit during zooming from the wide angle end to the telephoto end, ΔD23 is a change amount of the space between the second lens unit and the third lens unit during zooming from the wide angle end to the telephoto end, signs of the change amounts of the spaces are set as positive when the spaces increase at the telephoto end as compared with the wide angle end, and are set as negative when the spaces decrease at the telephoto end as compared with the wide angle end, and fL1 is a focal length of the first lens unit, and fL2 is a focal length of the second lens unit.

2. The zoom lens according to claim 1, wherein the second lens unit consists of one or two lenses including one positive lens.

3. The zoom lens according to claim 1, wherein during zooming from the wide angle end to the telephoto end, the third lens unit is moved to the image side.

4. The zoom lens according to claim 1, wherein the second lens unit is immobile during zooming.

5. The zoom lens according to claim 1, wherein a conditional expression $$0.2 < -\Delta M1/Tdw < 0.5$$

is satisfied, where ΔM1 is a moving amount of the first lens unit in zooming from the wide angle end to the telephoto end, Tdw is a lens length of the zoom lens at the wide angle end, a sign of the moving amount of the lens unit is positive when the lens unit is positioned at the image side at the telephoto end as compared with the wide angle end, and the sign of the moving amount is negative when the lens unit is positioned at the object side at the telephoto end as compared with the wide angle end.

6. The zoom lens according to claim 1, wherein a conditional expression $$0.03 < \Delta M3/Tdw < 0.25$$

is satisfied, where ΔM3 is a moving amount of the third lens unit during zooming from the wide angle end to the telephoto end, Tdw is the lens length of the zoom lens at the wide angle end, a sign of the moving amount of the lens unit is positive when the lens unit is positioned at the image side at the telephoto end as compared with the wide angle end, and the sign of the moving amount is negative when the lens unit is positioned at the object side at the telephoto end as compared with the wide angle end.

7. The zoom lens according to claim 1, wherein a conditional expression $$0.2 < \Delta D13/Tdw < 0.8$$

is satisfied, where ΔD13 is a change amount of a space between the first lens unit and the third lens unit during zooming from the wide angle end to the telephoto end, and Tdw is a lens length of the zoom lens at the wide angle end.

8. The zoom lens according to claim 1, wherein conditional expression $$0.7 < fL1/ft < 2.0$$

is satisfied.

9. The zoom lens according to claim 1, wherein conditional expression $$0.6 < fL2/ft < 2.5$$

is satisfied.

10. The zoom lens according to claim 1, wherein conditional expression $$0.1 < -fL3/ft < 0.5$$

is satisfied, where fL3 is a focal length of the third lens unit.

11. The zoom lens according to claim 1, wherein conditional expression $$0.15 < fL4/ft < 0.60$$

is satisfied, where fL4 is a focal length of the fourth lens unit.

12. The zoom lens according to claim 1, wherein the zoom lens comprises in order from the object side to the image side: the first lens unit; the second lens unit; the third lens unit; the fourth lens unit; a fifth lens unit having a negative refractive power; a sixth lens unit having a positive refractive power; a seventh lens unit having a negative refractive power; an eighth lens unit having a positive refractive power; and a ninth lens unit having a negative refractive power.

13. The zoom lens according to claim 1, wherein the zoom lens comprises in order from the object side to the image side: the first lens unit; the second lens unit; the third lens unit; the fourth lens unit; a fifth lens unit having a negative refractive power; a sixth lens unit having a positive refractive power; a seventh lens unit having a negative refractive power; and an eighth lens unit having a positive refractive power.

14. The zoom lens according to claim 1, wherein the zoom lens comprises in order from the object side to the image side: the first lens unit; the second lens unit, the third lens unit; the fourth lens unit; a fifth lens unit having a negative refractive power; and a sixth lens unit having a positive refractive power.

15. An image pickup apparatus comprising:
   the zoom lens according to claim 1; and
   an image pickup device that receives light from the zoom lens.

* * * * *